United States Patent
Peng et al.

(10) Patent No.: US 8,171,165 B2
(45) Date of Patent: May 1, 2012

(54) FILE CONVERSION SYSTEM ASSIGNING SPLIT PIECES TO A PLURALITY OF DEVICES AND METHOD USED THEREBY

(75) Inventors: Wei-Hao Peng, Taipei (TW); Shien-Chang Ko, Taipei (TW); Shu-Fan Chen, Chiayi County (TW)

(73) Assignee: Ubitus Inc., Taipei (TW)

( * ) Notice: Subject to any disclaimer, the term of this patent is extended or adjusted under 35 U.S.C. 154(b) by 408 days.

(21) Appl. No.: 11/964,096

(22) Filed: Dec. 26, 2007

(65) Prior Publication Data
US 2009/0138540 A1 May 28, 2009

(30) Foreign Application Priority Data
Nov. 26, 2007 (TW) ................................ 96144851 A

(51) Int. Cl.
*G06F 15/16* (2006.01)
(52) U.S. Cl. ........ 709/246; 709/245; 709/244; 709/247; 709/248
(58) Field of Classification Search .................. 709/246, 709/245, 247, 243, 248
See application file for complete search history.

(56) References Cited

U.S. PATENT DOCUMENTS

| | | | | |
|---|---|---|---|---|
| 6,965,569 | B1 * | 11/2005 | Carolan et al. | 370/238 |
| 7,447,728 | B1 * | 11/2008 | Arunkumar et al. | 709/200 |
| 2007/0121651 | A1 * | 5/2007 | Casey et al. | 370/401 |
| 2007/0283048 | A1 * | 12/2007 | Theimer et al. | 709/246 |

* cited by examiner

*Primary Examiner* — Jeffrey Pwu
*Assistant Examiner* — Abdelnabi Musa
(74) *Attorney, Agent, or Firm* — Alan Kamrath; Kamrath IP Lawfirm, PA

(57) ABSTRACT

A file conversion system is capable of transmitting via a network a file provided by a file providing end in a format supported by a file receiving end to the file receiving end. The file conversion system includes a receiving module for receiving the file provided by the file providing end; a conversion module for converting the format of the file provided by the file providing end into a format supported by the file receiving end; a database module for recording a profile of the file receiving end, with the profile including the format supported by the file receiving end; and a transmission module for transmitting the file to the file receiving end via the network. If the format of the file is not supported by the file receiving end, the conversion module may, in accordance with the profile of the file receiving end, convert the format of the file into the format supported by the file receiving end so as to allow the transmission module to transmit the file to the file receiving end.

12 Claims, 8 Drawing Sheets

FILE CONVERSION SYSTEM ASSIGNING SPLIT PIECES TO A PLURALITY OF DEVICES AND METHOD USED THEREBY

BACKGROUND OF THE INVENTION

1. Field of the Invention

The present invention relates to a file conversion system and a method used thereby and, more particularly, to a file conversion system and a method used thereby via a network.

2. Description of the Related Art

With advances in technology, several electronic devices that have been developed enable users to view audiovisual or text files via a network with devices such as computers, personal digital assistants (PDA), and mobile phones. With the strong transmission capabilities of the network, these audiovisual or text files may be transmitted from one electronic device to another electronic device easily.

However, when a file is transmitted from one electronic device to another electronic device, it may not be opened or viewed successfully in the latter electronic device, mainly because of inconsistent coding formats of the two electronic devices. For two different types of electronic devices, the problem mentioned above is even more serious. For example, a file in WMV format can be opened on a computer but may not be opened on many mobile phones. Accordingly, a codec conversion needs to be performed before the file can be opened in certain electronic devices. However, the codec conversion needs a large number of calculations and will inevitably use up a lot of system resource. Thus, for electronic devices with limited operational capability or storage space, such as mobile phones, files cannot be transmitted without limits.

Therefore, there is a need to provide a novel file conversion system and a method used thereby to mitigate and/or obviate the aforementioned problems.

SUMMARY OF THE INVENTION

It is therefore an object of the present invention to provide a file conversion system and a method used thereby for transmitting, via a network, a file provided by a file providing end to a file receiving end in a format supported by the file receiving end.

The file conversion system of this invention comprises: a receiving module for receiving the file provided by the file providing end; a conversion module for converting the format of the file provided by the file providing end into a format supported by the file receiving end; a database module for recording a profile of the file receiving end, with the profile comprising the format supported by the file receiving end; and a transmission module for transmitting the file to the file receiving end via the network. If the format of the file is not supported by the file receiving end, the conversion module may, in accordance with the profile of the file receiving end, convert the format of the file into the format supported by the file receiving end so as to allow the transmission module to transmit the file to the file receiving end.

The file conversion method of this invention comprises: recording a profile of the file receiving end, with the profile comprising a format supported by the file receiving end; receiving the file provided by the file providing end; determining whether the file provided by the file providing end is supported by the file receiving end; if not, converting in accordance with the format supported by the file receiving end the format of the file provided by the file providing end into the format supported by the file receiving end; and transmitting the converted file to the file receiving end via the network.

Other objects, advantages, and novel features of the invention will become more apparent from the following detailed description when taken in conjunction with the accompanying drawings.

BRIEF DESCRIPTION OF THE DRAWINGS

The accompanying drawings, which are included in and constitute a part of this specification, illustrate the embodiments of the invention and, together with the description, explain the features and principles of the invention. In the drawings.

DETAILED DESCRIPTION OF THE PREFERRED EMBODIMENTS

Figure 1:
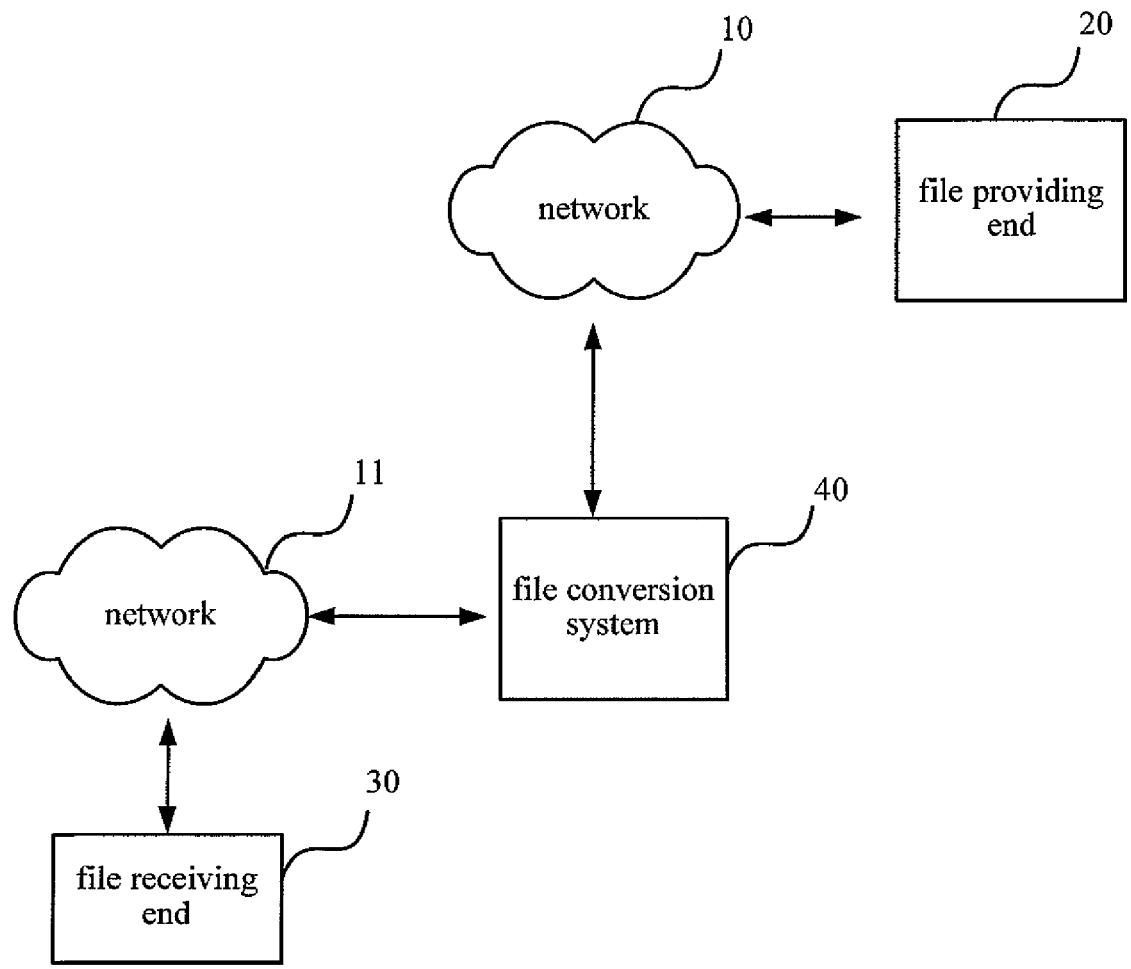
FIG. 1 is an illustrative block diagram of the operation environment of the file conversion system of this invention.

Please refer to FIG. 1 for an illustrative block diagram showing one embodiment of the operation environment of the file conversion system of this invention. As shown in FIG. 1, in one embodiment of this invention, a file conversion system 40 is in connection to a file providing end 20 and a file receiving end 30 via a network 10. The file conversion system 40 may receive a file provided by the file providing end 20 via the network 10 and transmit the file via a network 11 in a format supported by the file receiving end 30 to the file receiving end 30. In one embodiment of this invention, the file provided by the file providing end 20 may be, without limitation, an audiovisual file, an audio file, an image file, or a text file. In addition, in one embodiment of this invention, the file provided by the file providing end 20 may be, without limitation, obtained from the resources on the Internet, such as from YouTube, eMule, eDonky, Kuro, ezPeer, BitTorrent, and other peer-to-peer websites.

In one embodiment of this invention, the network 10 and the network 11 may be individually a wired network or a wireless network. For example, the network 10 and the network 11 may be, but is not limited to, the Internet, general packet radio service (GPRS), third generation (3G) mobile communication, wireless fidelity (Wi-Fi), worldwide interoperability for microwave access (WiMAX), or other networks. Furthermore, the network 10 and the network 11 may be the same type of network or not. For example, the network 10 may be the Internet, and the network 11 may be the 3G mobile communication network.

In one embodiment of this invention, the file providing end 20 may be a software program, a hardware device, firmware, or a combination thereof. The file providing end 20 may be, without limitation, equipped to a computer, a mobile phone, a personal digital assistant (PDA), a game console, or a set-top box. It should be noted that the file providing end 20 may be equipped to any device as long as the device can be connected to the network 10 and is capable of providing a file. In one embodiment of this invention, the file receiving end 30 may be a software program, a hardware device, firmware, or a combination thereof. Similarly, the file receiving end 30 may be, without limitation, equipped to a computer, a mobile phone, a personal digital assistant (PDA), a game console, or a set-top box. It should be noted that the file receiving end 30 may be equipped to any device as long as the device can be connected to the network 11 and is capable of receiving a file. Furthermore, in one embodiment of this invention, the file conversion system 40 may be, without limitation, equipped to a computer, a mobile phone, a personal digital assistant (PDA), a game console, or a set-top box. The file conversion system 40 of this invention may be equipped to any device as long as the device can be connected to the network 10 and the network 11 and is capable of converting a file.

Moreover, in one embodiment of this invention, the file receiving end 30 is a client end, and the file providing end 20 is a server end. However, the present invention is not limited thereto. The client end (i.e. the file receiving end 30) may, via the network 10 and the network 11, send a request to the server end (i.e. the file providing end 20) for downloading or viewing a file provided by the server end (i.e. the file providing end 20). The server end (i.e. the file providing end 20) may reply to the request and provide the client end (i.e. the file receiving end 30) with the file. However, the present invention is not limited thereto. In one embodiment of this invention, the server end (i.e. the file providing end 20) may also provide the client end (i.e. the file receiving end 30) with a file in response to a request not coming from the client end (i.e. the file receiving end 30).

Figure 2:
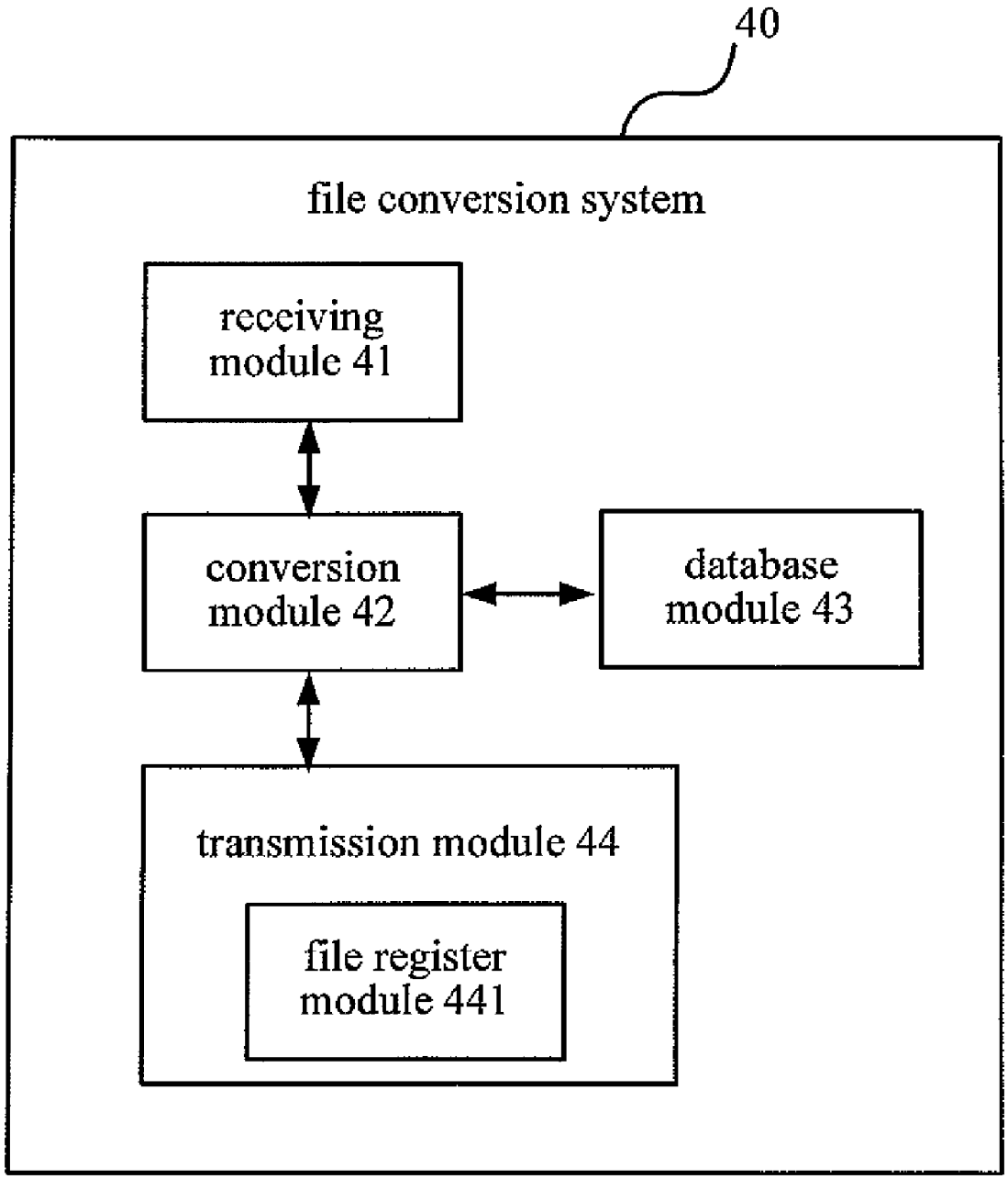
FIG. 2 is a functional block diagram of the file conversion system of this invention.

Please refer to FIG. 2 for a functional block diagram of the file conversion system 40 of one embodiment of this invention. As shown in FIG. 2, in one embodiment of this invention, the file conversion system 40 comprises a receiving module 41, a conversion module 42, a database module 43, and a transmission module 44, each of which is responsible for the execution of a specific function. The receiving module 41 may receive the file provided by the file providing end 20. The conversion module 42 may convert the format of the file provided by the file providing end 20 into another format. For example, the conversion module 42 may perform a codec conversion to convert a WMV format file into a 3GP format file. The database module 43 may record a profile of the file receiving end 30. The profile may comprise, without limitation, a format supported by the file receiving end 30. The profile recorded by the database module 43 may include the size of the screen, the speed of the CPU, the capacity of the memory, and other types of data for determining the most appropriate format to be received by the file receiving end 30. Accordingly, the conversion module 42 may convert the format of the file into the most appropriate format to be received by the file receiving end 30 in accordance with the profile recorded by the database module 43. For example, if the file receiving end 30 is a mobile phone, the conversion module 42 may convert the WMV format file with a 640×480 resolution into a 3GP format file with a 120×160 resolution, enabling the file receiving end 30 to view the file.

In addition, in one embodiment of this invention, the database module 43 may, without limitation, utilize the model type of the file receiving end 30 as an index. The transmission module 44 may transmit the file to the file receiving end 30 via the network 11. In one embodiment of this invention, the transmission module 44 comprises a file register module 441. Furthermore, when the transmission module 44 transmits the file to the file receiving end 30 via the network 11, it may transmit not only the real file to be downloaded by the file receiving end 30 but also a stream file to be viewed by the file receiving end 30.

For example, the transmission module 44 may in accordance with the profile recorded in the database module 43 determine whether the file receiving end 30 supports real-time transport protocol (RTP) and other real-time transmission protocols. If yes, the transmission module 44 may choose to transmit the stream file to the file receiving end 30. In one embodiment of this invention, when the stream file is transmitted to the file receiving end 30, the file register module 441 may temporarily store the part of the file that has been gradually converted by the conversion module 42 so as to enable the transmission module 44 to transmit the part of the file to a network address.

In one embodiment of this invention, the aforementioned modules may individually be configured as a hardware device, firmware, a combination thereof, an electric circuit, or other proper configuration. In addition, each module may be in the form of an individual configuration or a combined configuration.

Figure 3:
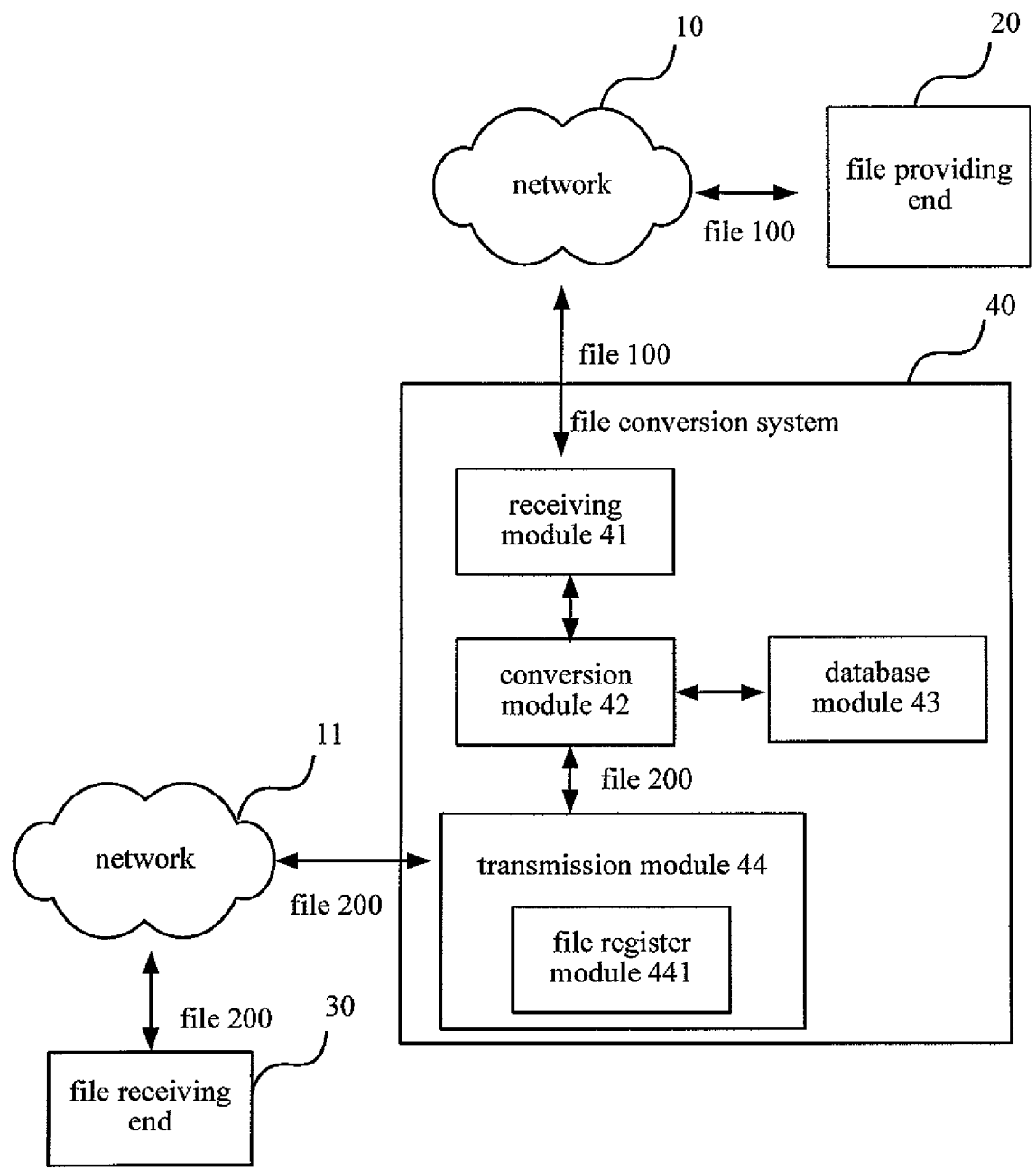
FIG. 3 is a functional block diagram showing the conversion process of the file conversion system of this invention.

Refer to FIG. 3 for a functional block diagram showing the conversion process of the file conversion system 40 of one embodiment of this invention. As shown in FIG. 3, the file providing end 20 provides a file 100, and the receiving module 41 of the file conversion system 40 may receive the file 100 via the network 10. If the format of the file 100 is not supported by the file receiving end 30, the conversion module 42 may in accordance with the profile of the format supported by the file receiving end 30 recorded in the database module 43 convert the file 100 into a file 200 whose format is supported by the file receiving end 30 so as to allow the transmission module 44 to transmit the file 200 to the file receiving end 30 via the network 11. Thus, the file 100 originally not supported by the file receiving end 30 may be converted by the file conversion system 40 into the file 200 supported by the file receiving end 30 and transmitted to the file receiving end 30 via the network 11.

Figure 4:
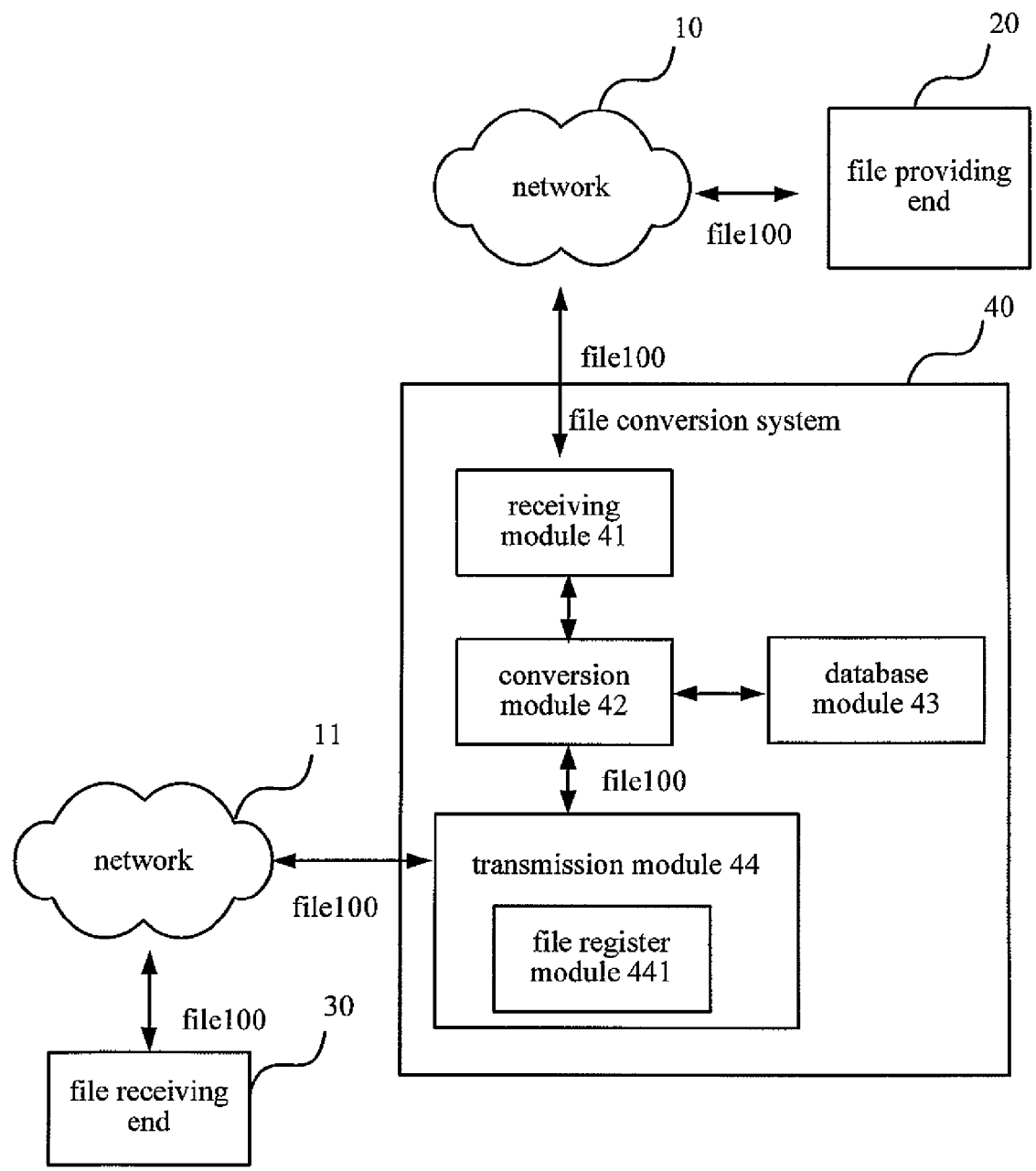
FIG. 4 is another functional block diagram showing the conversion process of the file conversion system of this invention.

However, as shown in FIG. 4, if the conversion module 42 determines in accordance with the profile of the format supported by the file receiving end 30 recorded in the database module 43 that the file 100 is supported by the file receiving end 30, the conversion module 42 will not proceed with the conversion. The file 100 will be transmitted in its original format by the transmission module 44 to the file receiving end 30 via the network 11.

Figure 5:
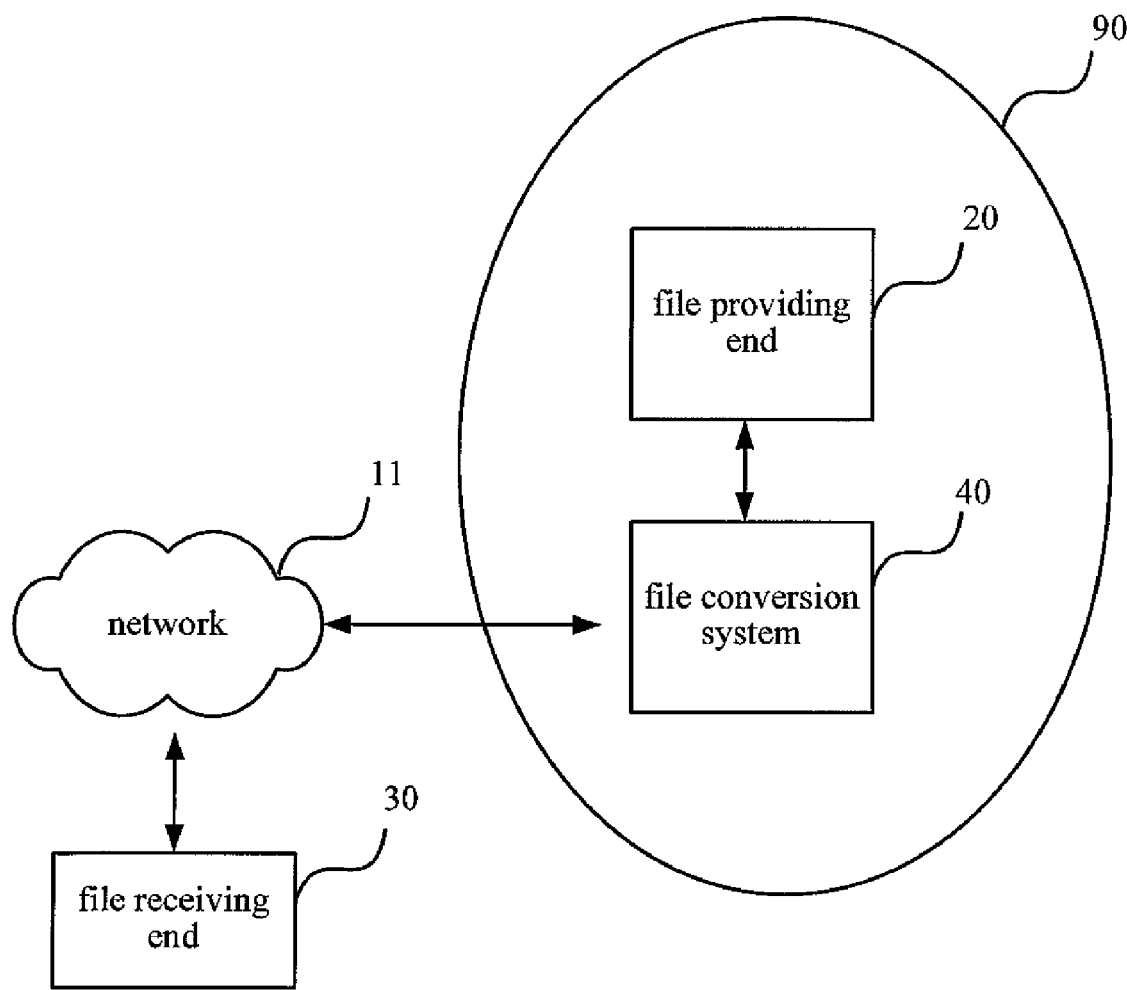
FIG. 5 is another illustrative block diagram of the operation environment of the file conversion system of this invention.
Figure 6:
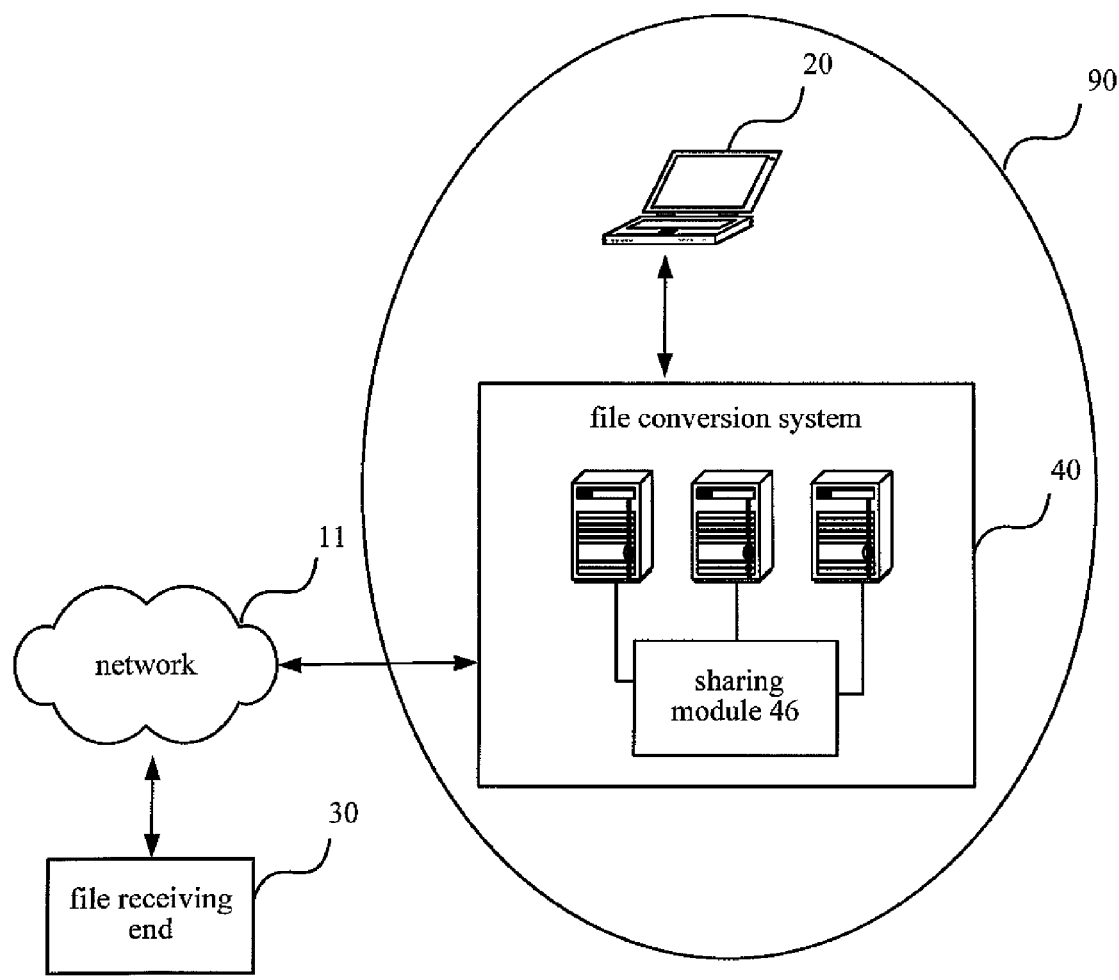
FIG. 6 is still another illustrative block diagram of the operation environment of the file conversion system of this invention.

Moreover, as shown in FIG. 5, in one embodiment of this invention, the file conversion system 40 and the file providing end 20 may be located in the same computer, mobile phone, personal digital assistant, game console, or set-top box or in the same web space 90 thereof. In addition, each device in the same web space may share with one another its system resources (e.g. file, operational capability, transmission capability, or memory space). Also, in addition to being interconnected via the network, the file conversion system 40 and the file providing end 20 may also be electrically connected via a bus, a connection wire, an electric circuit, or other means. As shown in FIG. 6, in one embodiment of this invention, the file conversion system 40, the file providing end 20, and the file receiving end 30 are located in the same web space 90 having a plurality of devices. In this case, the file requesting device is the one equipped with the file receiving end 30, and the device capable of providing the file requested by the file receiving end 30 is the one equipped with the file providing end 20. In the meantime, each device of the web space 90, including the device equipped with the file providing end 20 and/or the device equipped with the file receiving end 3U (in this embodiment, the device equipped with the file providing end 20 is used for illustration), may provide the file conversion system 40 to convert the file. Furthermore, the file conversion system 40 of this invention may further comprise a sharing module 46, which is equipped to each device of the web space 90 or electrically connected to each device of the web space 90 by other means, for enabling each device to share with one another its system resource, such as file, operational capability, or memory space. In one embodiment of this invention, the sharing module 46 may be configured as a hardware device, firmware, a combination thereof, an electric circuit, or other proper configuration. When the file conversion system 40 is to convert a file, the sharing module 46 may distribute the file conversion process to each device of the web space 90 and collect the same afterwards. Thus, the file conversion process which requires a large number of calculations may become more efficient. In one embodiment of this invention, the sharing module 46 may perform the distribution process in light of the operational capability of each device. For example, a device with more powerful operational capability may be assigned larger amounts of or more complicated calculations. In addition, in one embodiment of this invention, the file conversion process is conducted in a way that the sharing module 46 may first split the file and allocate the pieces to the shared memory space of each device of the web space 90. Then, the conversion module 42 equipped to each device may obtain the assigned piece and conduct an operation. After the operation, the piece may be placed back in the shared memory space for any follow-up file conversion operation, such as file combination. However, the file conversion process of this invention is not limited thereto.

In summary, this invention may solve several problems existing in the prior art and provides the advantages as follows:
1. Since the format supported by the client end (i.e. the file receiving end 30) is recorded in the database module 43, the file conversion system 40 of this invention may convert a file in accordance with the format most suitable for the client end.
2. Since each device of the web space 90 or of the file conversion system 40 may share its system resource with one another, the file conversion process may be distributed to each device, increasing the efficiency of the file conversion process.
3. In this invention, the file conversion process is not conducted by the file receiving end 30, so the file receiving end 30 does not need to spare any system resource for an operation such as the codec conversion in the prior art. More specifically, the format of the file to be viewed or downloaded is of no relevance to the file receiving end 30.
4. In addition to real files, this invention may also transmit stream files to the file receiving end 30 for viewing. Therefore, even a file receiving end 30 with limited memory space (e.g. mobile phones) may also successfully view the file it requests.

Moreover, this invention also provides a file conversion method for transmitting via a network a file provided by a file providing end in a format supported by a file receiving end to the file receiving end. Now, refer to FIGS. 7A and 7B for flowcharts of two different embodiments of the file conversion method of this invention. In one embodiment of this invention, the file conversion method of this invention may be carried out by the file conversion system 40 mentioned above. However, this invention is not limited thereto. Any other systems or devices may also be used as long as they are capable of performing the method.

Figure 7A:
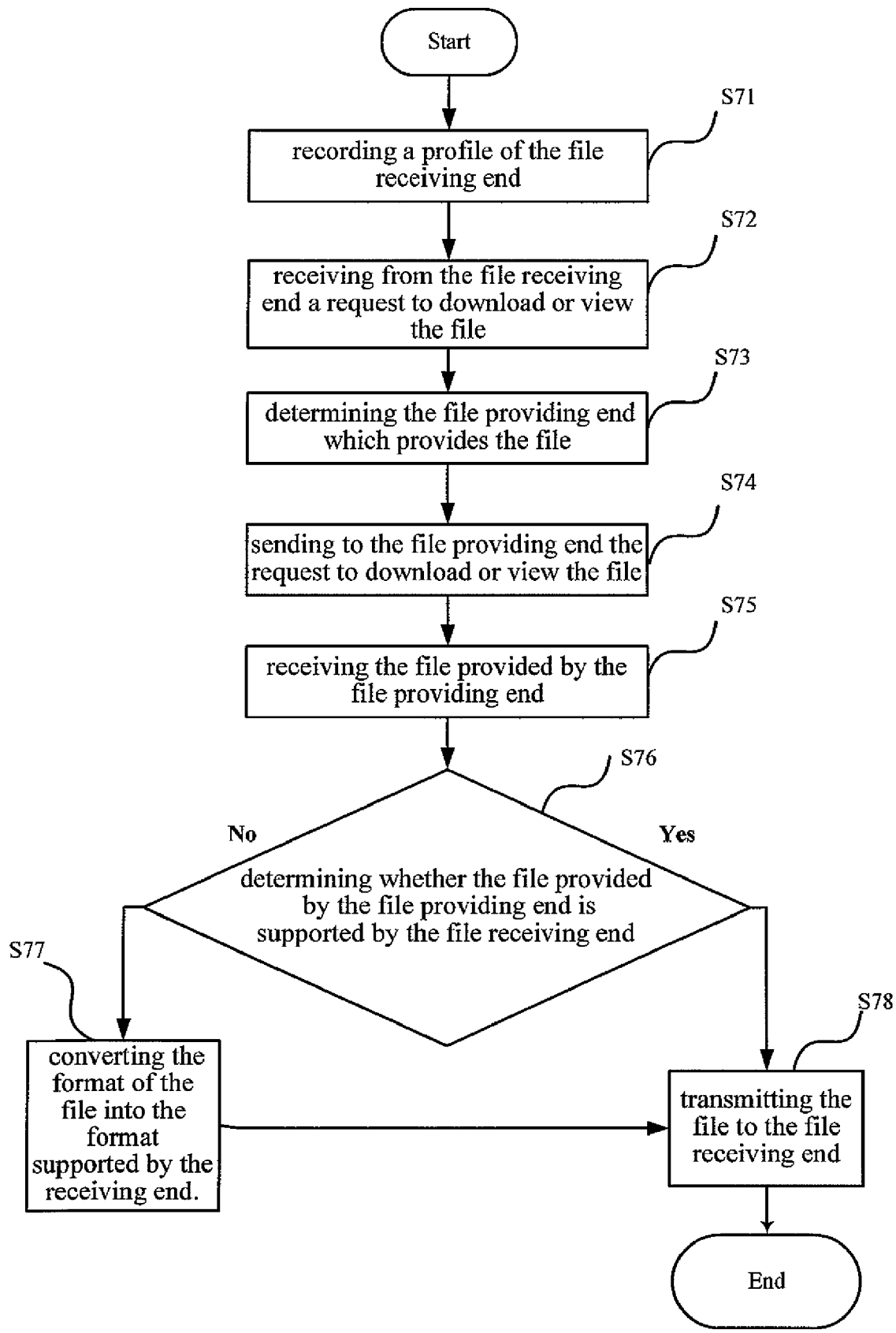
FIG. 7A is a flowchart of one embodiment of the file conversion method of this invention.

As shown in FIG. 7A, in one embodiment of this invention, the file conversion method of this invention comprises steps S71, S72, S73, S74, S75, S76, S77, and S78, which are elaborated below.

First, this invention conducts step S71: recording a profile of the file receiving end 30.

In step S71, this invention records a profile of the file receiving end 30. In one embodiment of this invention, step S71 may comprise the following steps:
receiving from the file receiving end 30 a request to record a profile;
determining whether the profile of the file receiving end 30 has been recorded; and
if not, recording the profile of the file receiving end 30.

In one embodiment of this invention, the profile comprises, without limitation, the format supported by the file receiving end 30. For example, it may include the size of the screen, the speed of the CPU, the capacity of the memory, and other types of data for determining the most appropriate format to be received by the file receiving end 30. Moreover, in one embodiment of this invention, the model type of the file receiving end 30 is used as the index of the profile, but this invention is not limited thereto.

Then this invention proceeds with step S72: receiving from the file receiving end 30 a request to download or view the file.

In step S72, this invention receives from the file receiving end 30 a request to download or view the file. In one embodiment of this invention, without limitation, the file receiving end 30 is the client end, and the file providing end 20 is the server end. The client end may via the network request to download or view a file provided by the server end.

After that is step S73: determining the file providing end 20 which provides the file.

In one embodiment of this invention, the file providing end 20 may be equipped to one of the computers, mobile phones, personal digital assistants, game consoles, or set-top boxes located in the same web space. Accordingly, in step S73, the present invention may search for and find the file providing end 20 which provides the file in accordance with the file requested by the file receiving end 30.

After finding the file providing end 20 which provides the file, this invention proceeds with step S74: sending to the file providing end the request to download or view the file.

After the file providing end 20 replies to the request of step S74, the present invention proceeds with step S75: receiving the file provided by the file providing end 20.

Then, the present invention proceeds with step S76: determining whether the file provided by the file providing end 20 is supported by the file receiving end 30.

In step S76, the present invention may, in accordance with the recorded data of the format supported by the file receiving end 30, determine whether the file provided by the file providing end 20 is supported by the file receiving end 30.

If yes, the present invention proceeds with step S78: transmitting the file to the file receiving end 30. If not, the present invention proceeds with step S77: converting the format of the file into the format supported by the receiving end.

In step S77, the recorded data of the format supported by the file receiving end 30, such as the size of the screen, the speed of the CPU, the capacity of the memory, and other types of data for determining the most appropriate format to be received by the file receiving end 30, may be used by the present invention to convert the format of the file into the format supported by the receiving end 30. After that, step S78 is conducted to transmit the file to the file receiving end 30. In one embodiment of this invention, this invention is capable of distributing the file conversion process to each device so as to accelerate the conversion of a file that requires a large number of calculations.

Figure 7B:
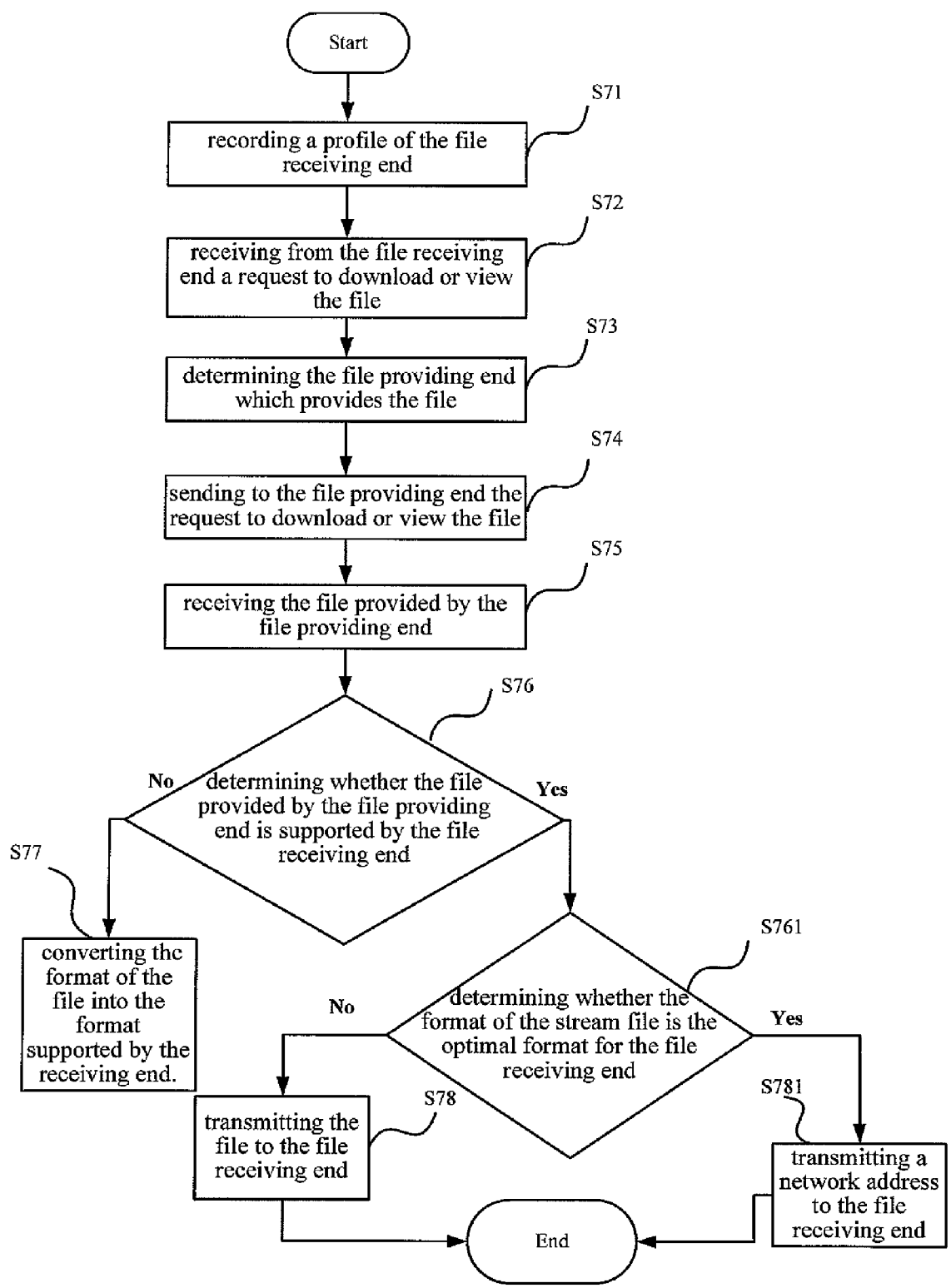
FIG. 7B is a flowchart of another embodiment of the file conversion method of this invention.

In one embodiment of this invention, in addition to the transmission of a real file to the file receiving end 30, this invention may also transmit a network address thereto so that the file receiving end 30 may receive a stream file from the network address. As shown in FIG. 7B, unlike the process shown in FIG. 7A, after steps S76 or S77, this invention may conduct step S761: determining whether the format of the stream file is the optimal format for the file receiving end 30. If not, the present invention will proceed with step S78: transmitting the file to the file receiving end 30. If yes, step S781 will be conducted: transmitting a network address to the file receiving end 30 so as to make the file receiving end 30 receive a stream file from the network address. By the use of the determination in step S761, this invention is capable of transmitting real files as well as stream files to the file receiving end 30 for viewing. Therefore, even a file receiving end 30 with limited memory space (e.g. mobile phones) may still successfully view the file it needs.

Although the present invention has been explained in relation to its preferred embodiments, it is to be understood that many other possible modifications and variations can be made without departing from the spirit and scope of the invention as hereinafter claimed.

What is claimed is:

1. A file conversion system located within a web space comprising a plurality of devices, the file conversion system comprising:
    a receiving module receiving a file in a format provided by a file providing end;
    a sharing module splitting the file into pieces and allocating an assigned piece to each of the plurality of devices;
    a conversion module converting the format of the file provided by the file providing end into a format supported by a file receiving end, wherein the conversion module is equipped to each device for obtaining the assigned piece and conducting a converting operation to the assigned piece, and after the converting operation, the assigned piece of each device is collected by the sharing module;
    a database module recording a profile of the file receiving end, with the profile comprising a format supported by the file receiving end; and
    a transmission module transmitting the file to the file receiving end via a network, wherein each of the receiving module, the conversion module, the database module, the transmission module and the sharing module is configured as a hardware device, a firmware or an electric circuit, wherein the transmission module transmits a stream file when transmitting the file to the file receiving end, and the transmission module comprises a file register module temporarily storing the stream file; and
    wherein if the format of the file is not supported by the file receiving end, the conversion module converts, in accordance with the profile of the file receiving end, the format of the file into the format supported by the file receiving end so as to allow the transmission module to transmit the file to the file receiving end.

2. The file conversion system as claimed in claim 1, wherein the sharing module allocates the assigned piece to each device in accordance with a system resource of each of the plurality of devices.

3. The file conversion system as claimed in claim 1, wherein the file providing end is equipped to a computer, a mobile phone, a personal digital assistant, a game console, or a set-top box.

4. The file conversion system as claimed in claim 1, wherein the file receiving end is equipped to a computer, a mobile phone, a personal digital assistant, a game console, or a set-top box.

5. The file conversion system as claimed in claim 1, wherein the file conversion system and the file providing end are located within a same web space.

6. The file conversion system as claimed in claim 1, wherein each of the plurality of devices is a computer, a mobile phone, a personal digital assistant, a game console, or a set-top box, wherein the database module records the profile of each device including a system resource of each device, wherein the system resource comprises a file, operational capability, transmission capability, or memory space to be provided.

7. The file conversion system as claimed in claim 1, wherein the file register module is configured as a hardware device, firmware, a combination thereof, or an electric circuit.

8. A file conversion method comprising:
    recording a profile of a file receiving end, with the profile comprising a format supported by the file receiving end;
    with the file receiving end receiving a file in a format provided by a file providing end;
    determining whether the file provided by the file providing end is supported by the file receiving end;
    if not, splitting the file into pieces and allocating an assigned piece to each of a plurality of devices;
    with each of the plurality of devices obtaining the assigned piece and conducting a converting operation to the assigned piece;
    collecting the assigned piece after the converting operation from each of the plurality of devices for converting in accordance with the format supported by the file receiving end the format of the file provided by the file providing end into the format supported by the file receiving end; and
    transmitting the converted file to the file receiving end via a network, wherein a stream file is transmitted and temporarily stored when the converted file is transmitted to the file receiving end.

9. The file conversion method as claimed in claim 8, wherein prior to receiving the file in the format provided by the file providing end, the method further comprises:
    receiving from the file receiving end a request to download or view the file;
    determining the file providing end which provides the file; and
    sending to the file providing end the request to download or view the file.

10. The file conversion method as claimed in claim 8, further comprising:
    recording a profile of each of the plurality of devices comprising a system resource of each device, the system resource comprising a file, operational capability, transmission capability or memory space to be provided.

11. The file conversion method as claimed in claim 8, wherein a network address is transmitted when the converted file is transmitted to the file receiving end so as to enable the file receiving end to receive a stream file from the network address.

12. The file conversion method as claimed in claim 8, wherein the recording of the profile of the file receiving end further comprises:
    receiving from the file receiving end a request to record the profile;
    determining whether the profile of the file receiving end has been recorded; and
    if not, recording the profile of the file receiving end.

* * * * *